United States Patent [19]

Persinger

[11] 4,308,844
[45] Jan. 5, 1982

[54] METHOD AND APPARATUS FOR IMPROVING EFFICIENCY IN COMBUSTION ENGINES

[76] Inventor: James G. Persinger, 910 S. Harrison, Hugoton, Kans. 67951

[21] Appl. No.: 46,754

[22] Filed: Jun. 8, 1979

[51] Int. Cl.³ .............................................. F02B 51/04
[52] U.S. Cl. ..................................... 123/539; 123/537
[58] Field of Search ......................... 123/536, 539, 537

[56] References Cited

U.S. PATENT DOCUMENTS

| | | | |
|---|---|---|---|
| 1,333,836 | 3/1920 | Csanyi | 123/539 |
| 1,873,746 | 8/1932 | English | 123/539 |
| 2,926,276 | 2/1960 | Moriya | 123/536 |
| 4,011,843 | 3/1977 | Feurman | 123/537 |

Primary Examiner—Ronald H. Lazarus
Attorney, Agent, or Firm—Frank Frisenda, Jr.

[57] ABSTRACT

A method and apparatus for improving the efficiency of an internal combustion engine by producing ozone gas and positively charged air particles in a supply of air to an engine. The apparatus comprises an ozone generator cell suitably positioned with respect to the engine so that an air supply to the engine passes between adjacent plates of the ozone generator. In one embodied form, the apparatus comprises a tubular ozone generator cell for charging and ionizing a relatively small volume of air to the engine. The air supply to the generator may be first treated to substantially remove ambient moisture by means of a suitable air dryer. Optionally, a plurality of generators may be connected in sequence to provide an increased source of ozone gas to the engine thereby to commensurately reduce fuel consumption and exhaust gas emissions.

8 Claims, 3 Drawing Figures

U.S. Patent  Jan. 5, 1982  4,308,844
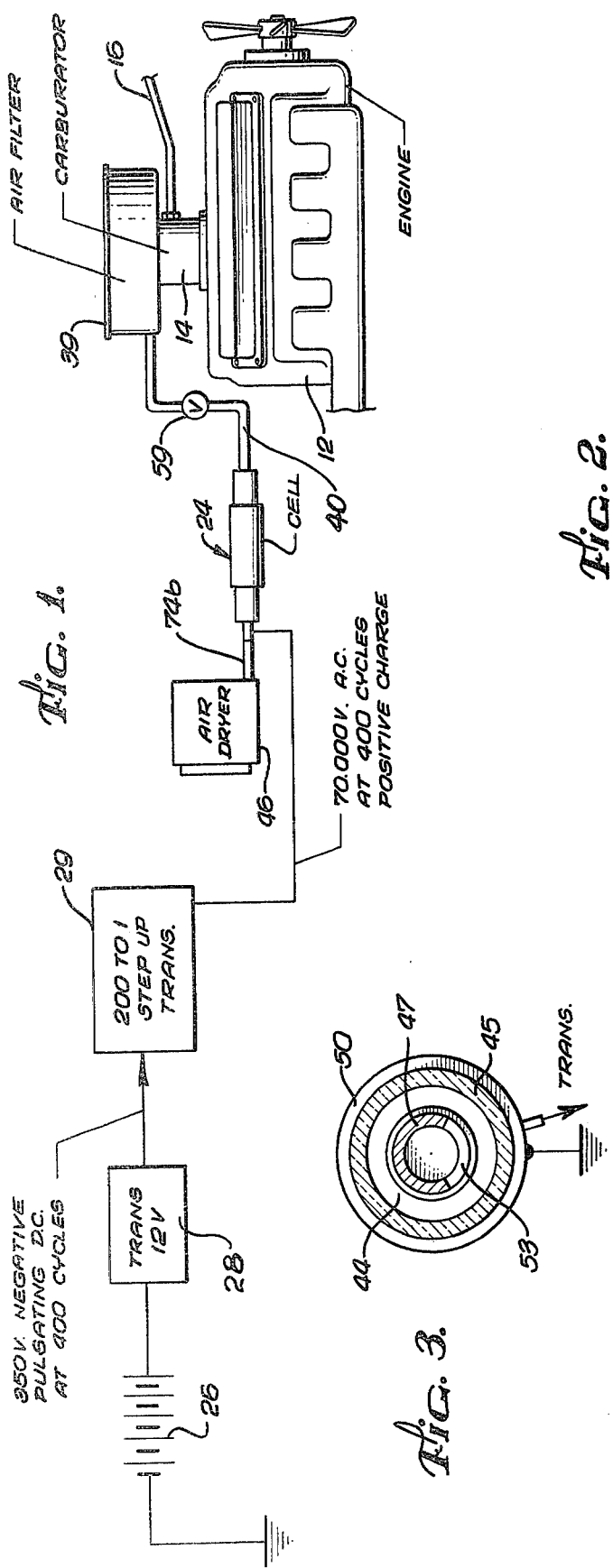
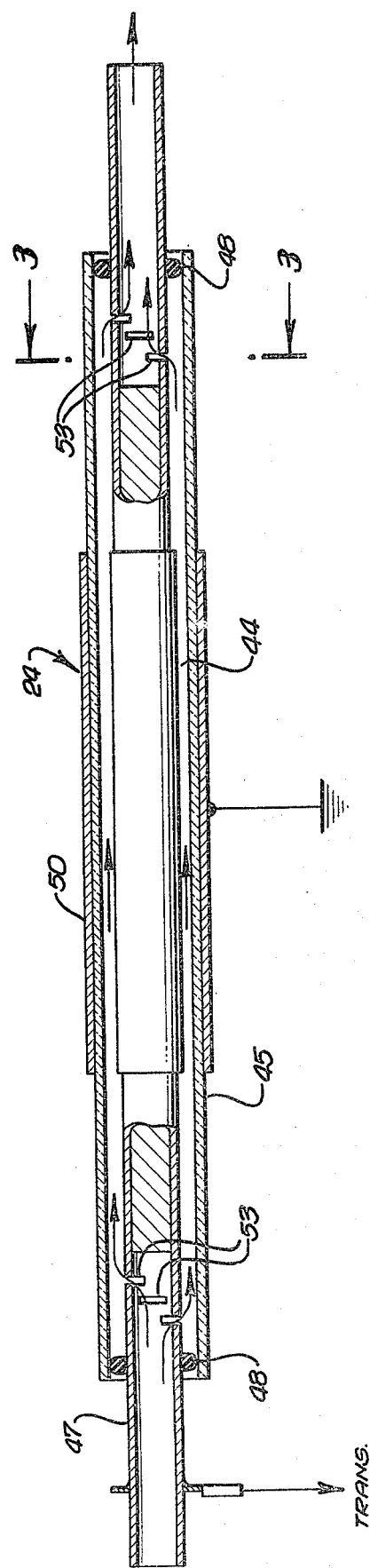

METHOD AND APPARATUS FOR IMPROVING EFFICIENCY IN COMBUSTION ENGINES

BACKGROUND OF THE INVENTION

This invention relates to a method and an apparatus for producing ozone gas and positively charged air particles in a supply of air to an engine, and to a method of using such apparatus for improving the efficiency of an internal combustion engine, both from the standpoint of reduced fuel consumption and reduced exhaust gas emissions.

The addition of ozone gas to a combustion mixture in an internal combustion engine is disclosed, for example, in U.S. Pat. No. 1,982,484 issued to Runge. The Runge system utilizes a distributor of an internal combustion engine to produce ozone gas which is then added to the combustion mixture flowing through an intake manifold of the engine. The system is said to both prevent deposition of carbon in the engine's cylinders and to consume carbon already so deposited. U.S. Pat. No. 1,989,499 to Sabot discloses a device which achieves better mixing of a combustible fuel, such as heavy oil, and air used to support combustion by using an ionizer which produces ozone and charges ions of the air-fuel combustion mixture. U.S. Pat. No. 2,410,403 to Baudine discloses a method for more rapid starting of aircraft engines in cold ambient temperature by injecting ozone into combustion air flowing into such engines.

A wide variety of apparatus for producing ozone gas are also disclosed in the art. For example, U.S. Pat. No. 4,051,043 to Harter discloses an apparatus which applies a large alternating potential to plates separated by a flow of air to produce ozone gas. The Harter apparatus uses a D.C. power source, transformer means and switching means to produce a potential across the plates in the range of 100 to 3,000 volts. Accordingly, the potential in such apparatus alternates at a frequency in the range of 3,000 to 4,000 cycles per second.

While the foregoing devices may have accomplished intended objectives, the present invention is designed for improving efficiency of an internal combustion engine during the normal course of its operation. In accordance with the present invention, a novel apparatus and method provides significant improvement in performance of the engine which justifies both cost of construction and cost of upkeep. Moreover, the instant device is reliable and will remain in service during the life of the engine which it supports and will remain in service without requiring frequent maintenance. Additionally, the cost of operation of the apparatus of the present invention is significantly less than the beneficial increase in engine performance which it produces.

SUMMARY OF THE INVENTION

The present invention significantly improves the efficiency of an internal combustion engine, reducing both fuel consumption and exhaust pollutants by producing ozone gas and positively charged particles in an air supply which supports combustion in the engine.

In all embodied forms, the novel apparatus of the present invention comprises a relatively compact, ozone generator which may be powered, for example, by a standard 12 volt automobile battery.

More specifically, the ozone generator is powered by an electrical source, comprised of D.C. current stepped-up by suitable transformers and switching means which convert the input supply to a potential of as high as 70,000 volts, or as low as 5,000 volts, the potential alternating at a frequency in the range between about 200 and about 400 cycles per second. In one embodied form, the ozone generator includes ionizing cells comprised of a series of plates to which the resultant potential is applied and a dielectric material separating the charge plates. A supply of air is filtered and dried air, by suitable means, flowed between gaps of the charged plates, before being directed to a carburetor where resultant ozone gas and positively charged air are mixed with fuel. In one preferred embodiment of the invention, a plurality of ozone generators sequentially connected to each other may be utilized. In another preferred embodiment a large ionizing cell capable of passing and ionizing the maximum volume of air the engine may demand and a small cell which can produce the desired effect on a small volume of air is extremely effective.

Accordingly, the ozone generator of the present invention ionizes oxygen in the air supply thereby producing ozone and also applies a positive charge to the air particles which promotes improved mixing and burning of the fuel and which promotes more complete combustion of the fuel in the combustion chambers of the engine.

Other features and advantages of the present invention will become apparent from the following detailed description, taken in conjunction with the accompanying drawings, which will illustrate by way of example, the principles of the invention.

DESCRIPTION OF THE DRAWINGS

FIG. 1 is a schematic flow diagram of one embodied form of the invention showing suitable circuitry and an ozone generator connected in sequence to an air intake manifold of a standard automobile engine;

FIG. 2 is a longitudinal sectional view of an embodied ozone generator cell in accordance with the present invention;

FIG. 3 is a cross sectional view of the second embodied cell taken substantially along line 3—3 in FIG. 2

DESCRIPTION OF THE PREFERRED EMBODIMENTS

As shown in the drawings, and with reference to FIG. 1, the present invention comprises an ozone generator cell 24 which acts on an air supply to an internal combustion engine 12. The generator cell 24 produces ozone in the air supply and induces a positive charge on portions of such supply. A carburetor 14 atomizes a suitable supply of fuel, from a fuel line 16, and mixes the fuel together with the ozone gas and charged air supply and discharges this mixture into an intake manifold (not shown) of an internal combustion engine 10 for instance, a standard automobile engine. The generator cell 10 can also be used in conjunction with engines having fuel injection devices rather than carburetors and in such applications the generator cell 24 processes the air supply before it enters the air intake manifold of a supercharger.

In one embodiment form, as best shown in FIG. 2, the generator cell 24 comprises metallic plates 47 and 50 disposed adjacent to one another and separated from each other by a dielectric material 45 and an air gap 44. A potential is induced across adjacent plates 47 and 50 causing ionization of oxygen in the air flowing through he gap 44 which results in production of ozone gas and ionizing air particles thus producing a gaseous mixture having a positive charge.

In accordance with the present invention, illustrated in FIG. 1, the generator cell 24 is suitably disposed within the air supply to the engine 12 and thereby produces ozone within the air supply and induces a charge on the mixture by applying an alternating potential of up to 70,000 volts across the plates 47 and 50. The potential across the gap 44, alternating at a frequency in the range between about 200 and about 400 cycles per second, produces ozone gas and adds positive charges to portions of the air supply thereby significantly improving the mixing of the fuel and the air and also improving the dispersion of the fuel-air mixture in the combustion chambers (not shown) of the engine 12.

In one embodiment as will be described more fully below, the apparatus of the present invention may comprise two cells sequentially connected to produce ozone. Accordingly, one cell 24 charges the air and produces ozone and improves performance when the engine is under light use and drawing only a small volume of air for combustion. Additionally, the plurality of cells improves the performance of the engine 12 under heavier use and when the volume of air flowing into the engine 12 is greater.

Referring to FIG. 1, the electrical power source for the generator cells may comprise a standard rechargeable twelve volt direct current battery 26 of the type usually associated with internal combustion engines from which a current of between about five and six amps is drawn. The current from the battery 26 is suitably fed to a first transformer 28 which converts the electrical output of the battery 26 to a negative 350 volt D.C. potential, pulsed at approximately 400 hertz. Switching means in the first transformer 28 convert the D.C. current output of the battery 26 into an alternating waveform ranging from about 0 volts to 350 volts at a given frequency per second, in one preferred embodiment of the invention. However, while the 350 volt potential alternates at approximately 400 cycles per second, frequencies as low as 200 cycles per second have been satisfactorily used. Preferably, the waveform of the electrical output of the fist transformer 28 is a square wave. A suitable transformer 28 for use in connection with the present invention is commercially available from Firewell Products Corporation of Northridge, California. For a further disclosure of the Firewell device reference may be had to disclosure in U.S. Pat. No. 3,658,044, which is hereby incorporated by this reference.

Variacs capable of adjusting the frequencies of alternation have been incorporated in some transformers, of the type used in the invention, but such variacs are not mandatory. Accordingly, a transformer with a fixed frequency output is also suitable. Empirical results have shown that the instant apparatus will increase vehicle gas mileage by 20% at a frequency of 200 cycles, and commensurately greater increase when the frequency is increased to a maximum of about 400 cycles.

With reference to FIG. 1, the output from the first transformer 28 is suitably connected to a second transformer 29 whose step-up ratio is approximately 200:1. A high performance automobile ignition coil can be suitably used for the second transformer 29. Such a transformer is commercially available from Automotive Controls Corp. of Banford, Connecticut under the designation "Super Coil," and under the trademark ACCEL Eliminator Ignition. Accordingly, The second transformer 29 can produce an output of up to 70,000 volts from the 350 volt input of the first transformer 28. The electrical output of the second transformer 29 is adapted to alternate at the same frequency as the electrical output from the first transformer 28.

In accordance with the present invention, the cell 24 is positioned directly in the input of an air filter 39 of the engine 12. Of course, any suitable configuration may be used and the cell 24 could be located at another convenient position which allows the gaseous output to be transmitted to the carburator engine 12 by a hose 40. However, the hose 40 must be capable of carrying ozone gas and charged air without excessive deterioration. In this respect, PVC, neoprene or other inert material could be used.

In a preferred embodiment of the invention, illustrated in FIGS. 2 and 3, a tubular ozone generator cell 24 is used to provide ozone and ionized air to the engine 12. In the cell 24, two cylindrical metallic plates 47 and 50 are separated by a dielectric and an air gap 44 or conduit. Accordingly, a borosilicate glass tube 45 acts as a dielectric and also acts as a conduit to contain air as it flows between the plates 47 and 45. A cylindrical conductive metal tube 47 is disposed within the glass cylinder 45 to function as the charged plate and means for directing air through the cell 24. The metal tube 47 is sealed in position within the glass cylinder 45 by suitable means such as air tight O-rings 48. Overlying the outside of the tube is the grounded plate 50 which in this embodiment is a conductive metal foil wrapped about the outside of the glass cylinder 45.

The metal tube 47 is blocked off at a location inside the glass cylinder 45 by a plug of sealant such as "Liquid Steel" brand glue sold by Permatex Co. of Newington, Conn. The blockage prevents air from passing the entire length of the metal tube 47. A suitable number of slits or holes 53 are located in a circumferential portion of the metal tube 47 so that air flowing with the metal tube 47 can escape from the tube 47 and pass into and through the conduit 44 between the outside diameter of the metal tube 47 and the inside diameter of the glass cylinder 45. In this manner, air flowing within the metal tube 47, can detour around the blockage in the tube, and then enter the tube at a point past the blockage. In operation, air is provided to the cell 24 flowing through metal tube 47, and escapes from the tube 47, through slits 53 and enters the conduit or air gap 44 between the metal tube 47 and the glass cylinder 45. Subsequently, the air flows through the gap between the plates 47 and 45, is ionized producing ozone which re-enters the metal tube 47 and leaves the cell 24.

In one presently preferred embodiment, a plurality of cells 24 are installed and concurrently operated. One cell 24 may be inserted directly within the air supply to the engine 12. The gaps 44 between the plates 47 and 50 are sufficiently large that they can accommodate a normal flow of air to the engine. However, it has been determined that when the volume of air required by the engine 12 is small, one cell 24 acting alone, provides better fuel efficiency and pollutant reduction. Accordingly, by using the cell 24 when even the engine is operated at slower speeds or under lighter loads, significant improvement in fuel performance can be achieved. Moreover, the improvement in fuel performance produced by using the cell 24 also occurs in damp or wet weather conditions. The cell 24, with its air passage may be conveniently connected to the air filter 39 or air intake of the engine to induce a flow of air through the cell 24, such as by a suitable pump. A hose 40 most suitably made of PVC, or other inert material, connects the cell 24 to the air filter 39 or air intake manifold (not shown) of the engine 12. A valve 59 is used to throttle the flow through the cell 24 at a rate of about 5 cubic feet per minute. At this rate, the cell 24 will produce approximately 2 lbs of ozone per hour.

In some instances, improvement in fuel efficiency and exhaust gas emissions results when air entering the cell 24 is dry. For this reason an air dryer 46 is provided before air is directed to the ozone generator cells. A suitable dryer 46, which is capable of reducing the dewpoint of the air to $-100°$ F., is "J-150 filter," a dryer-separator commercially available from Fuel Incorporated, 1108 Industrial St., Hugoton, Kans.

While location of the ozone generator cells of the present invention is not of critical importance, a typically mounting will be described below, with reference to FIG. 1. The cell may be placed immediately adjacent the air filter 39. The opening of the air filter 39 is modified slightly so that a cell can be placed in the intake of the air filter 39. The cell 24, suitably mounted, is connected to the dryer 46 by its own intake hose 74b. The first transformer 28 and second 29 transformers can be attached to the rigid sheet metal near the engine 12 such as the inside on the front wheel well or the battery holder (not shown).

Accordingly, the present invention provides an apparatus for improving efficiency of a combustion engine by ionization of an air supply to the engine. The unique apparatus comprises: inlet means for receiving the air supply to the combustion engine; means for ionizing the air supply to produce ozone gas and to produce a positively charged air and ozone gas mixture in an amount effective to improve engine efficiency.

The means for ionizing the air supply comprises in combination: a first inner cylinder composed of an electrically conductive material, a second intermediate cylinder composed of a dielectric material, and a third outer cylinder composed of an electrically conductive material, each cylinder being longitudinally aligned with one another in a concentric arrangement and to provide a cylindrical gap for directing the flow of air supply between an exterior surface of the first inner cylinder and an interior surface of the second intermediate cylinder.

The inventive apparatus further includes means for directing the flow of air supply received in an interior portion of one end of the first inner cylinder to the cylindrical gap where ionization of the air supply is effected and subsequently for directing the gaseous ionized mixture back to the interior portion of an opposite end of the first inner cylinder. Additionally, outlet means for directing the resultant gaseous ionized mixture to the combustion engine is included.

While the foregoing description describes modifications of a standard automobile engine, those skilled in the art will appreciate that any internal combustion engine can be utilized in accordance with the present invention. For instance, the present system may be utilized with any internal combustion engine, stationary engines, irrigation pump engines, or the like, powered by a fossil or hydrocarbon fuel such as natural gas, liquified petroleum, gasoline, diesel or mixtures thereof. It has been determined that fuel efficiency (miles/gallons) will be increased from 7 percent to 50 percent with an added amount of ozone from 1 to 6 lb. per 100 horse power hour.

Another significant advantage achieved by the present invention is the reduction in the amount of NO, CO, and unburned hydrocarbon emissions which are released from the engine exhaust by at least 7% with the above listed amount of ozone addition.

It has been found in the present invention that the use of a high potential allows the production of the required amount of ozone and the desired amount of the positive ionization of the air which is sufficient to effect the increased efficiency of the engine.

While a particular form of the invention has been illustrated and described, it will be apparent that various modifications can be made without departing from the spirit and scope of the invention.

I claim:

1. An apparatus for improving efficiency of a combustion engine by ionization of an air supply to the engine, the apparatus comprising:

inlet means for receiving the air supply to the combustion engine;

means for ionizing the air supply to produce ozone gas and to produce a positively charged air and ozone gas mixture in an amount effective to improve engine efficiency;

said means for ionizing the air supply comprising in combination: a first inner cylinder composed of an electrically conductive material, a second intermediate cylinder composed of a dielectric material, and a third outer cylinder composed of an electrically conductive material, each cylinder being longitudinally aligned with one another in a concentric arrangement and to provide a cylindrical gap for directing the flow of air supply between an exterior surface of said first inner cylinder and an interior surface of said second intermediate cylinder;

means for directing the flow of air supply received in an interior portion of one end of said first inner cylinder to said cylindrical gap where ionization of the air supply is effected and subsequently for directing the gaseous ionized mixture back to the interior portion of an opposite end of said first inner cylinder; and outlet means for directing the resultant gaseous ionized mixture to said combustion engine.

2. The apparatus as defined in claim 1 wherein said means for ionizing the air supply further comprises:

means for providing an electrical potential alternating between a prescribed maximum value and a minimum value.

3. The apparatus as defined in claim 2, wherein said means for providing an electrical potential comprises:

battery means; and transformer means for converting the output of said battery means to alternating electrical potential, between about 5,000 volts and about 70,000 volts at a frequency in the range of about 200 to about 400 cycles per second.

4. The apparatus as defined in claim 1 wherein said second intermediate cylinder of dielectric material comprises boro-silicate glass.

5. The apparatus as defined in claim 1, wherein said third outer cylinder comprises an electrically conductive metal foil wrapped about a portion of the exterior of said second intermediate cylinder composed of a dielectric material.

6. The appartus as defined in claim 1, wherein said means for directing the flow of air supply comprises a plurality of holes provided in circumferential end portions of said first inner cylinder.

7. The apparatus as defined in claim 1, wherein said means for ionizing the air supply produces from about 1 to about 6 lbs. per horse power hour of ozone gas.

8. The apparatus as defined in claim 1, wherein said means for ionizing the air supply to produce ozone gas and to produce a positively charged air and ozone gas mixture in an amount effective to improve engine efficiency comprises a plurality of means for ionizing the air supply sequentially connected with one another.

* * * * *